BENJAMIN GRAHAM
INVENTOR.

BY White & Haefliger
ATTORNEYS.

3,122,314
SCALE-TYPE CALCULATING DEVICE
Benjamin Graham, 611 N. Maple Drive,
Beverly Hills, Calif.
Filed July 23, 1962, Ser. No. 211,742
11 Claims. (Cl. 235—61)

This invention has to do generally with improvements in manually manipulated scale type calculators useable in general for making calculations for which slide rules are commonly employed.

My general objective is to provide a calculator which for at least many purposes and kinds of calculations, has advantages over conventional slide rules by means of simpler and more easily understandable scale systems, and greater facility and accuracies in relating and determining values entering into and resulting from the calculations.

The invention is predicated upon the use of arithmetic scales, as distinguished from logarithmic scales, locations and values along which are more easily and accurately determinable than logarithmic values. Additionally, and in the interests of greater convenience, facility and visibility in manipulation, the present calculator employs a simple arrangement of scales, one on what may be merely a flat card-like base, and the other on a flat arm swingable on the base.

In its mathematical aspects, the invention is further predicated upon the use of corresponding scales on the arm and body, each constituting a dual arrangement of contiguous linear scales individually of arithmetically equal dimensions, with the two scales related in the ratio of the square root of 10. By employing a reference arc about and intersectable by the arm scales, the device operates on the mathematical principle of similar triangles, and by providing for contiguous double scales having a greater and lesser numerical ranges, it is possible to achieve greater reading accuracies in a device of given size, or in other words, to reduce by half what otherwise would be the size required for comparable accuracy.

All the features and objects of the invention, as well as the details of certain typical and illustrative embodiments, will be more fully understood from the following description of the accompanying drawing, in which.

Figure 1:
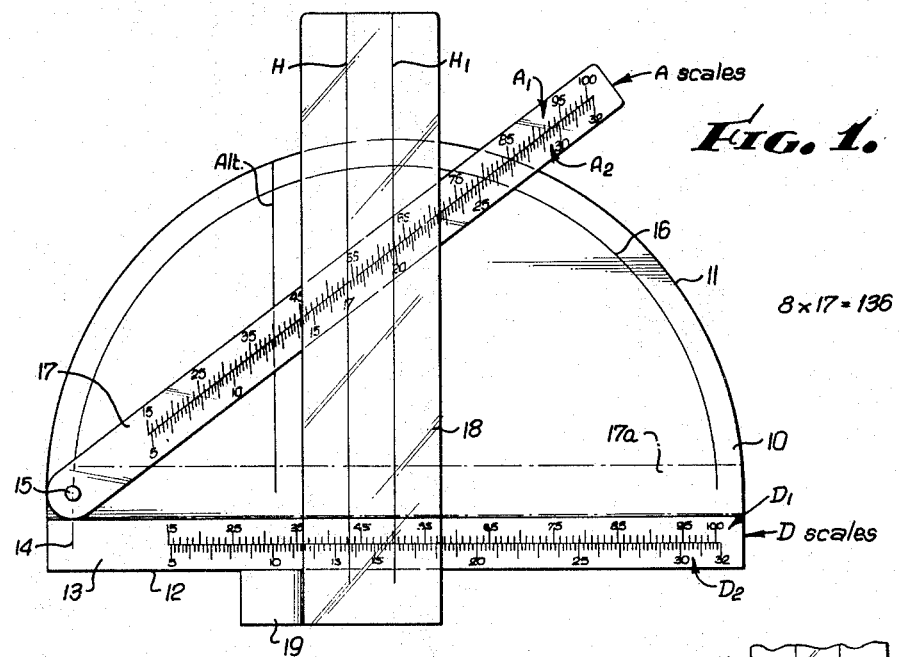
FIG. 1 is a view showing the device with its arm swung to an illustrative calculating position.
Figure 2:
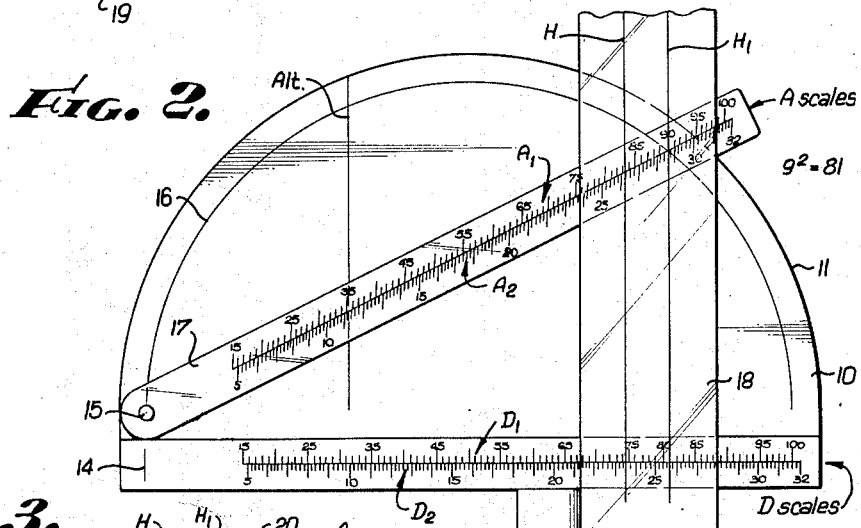
FIG. 2 is a view similar to FIG. 1 illustrating a different calculating position of the parts.

Referring to FIGS. 1 and 2, the calculator is shown to comprise a suitable body 10 which may be in the form of a flat sheet or card-like base having a semi-circular periphery 11 extended beyond its diameter to a straight edge at 12 parallel to the diameter. The body carries what may be termed D scales paralleling the edge 12 and which may be imprinted directly on the base, or on a separately formed strip 13 flatly affixed to the base.

The D scales comprise a pair of opposed scales $D_1$ and $D_2$, the former being a scale of 100 equal divisions between a marked or unmarked line 14 which is a projection of the center of pivot 15 normal to the straight edge 12, and the opposite extremity at "numeral 100" which is a projection of the terminal of arc 16 at its diameter through point 15, normal to the straight edge 12. The two scales $D_1$ and $D_2$ are related by the ratio of the square root of 10, in that any value along the $D_1$ scale is the square root of 10 times the corresponding value on the $D_2$ scale, the latter therefor having values up to 31.62 at and corresponding to the 100 terminal of the $D_1$ scale. As will be noted, the upper or $D_1$ scale is divided into units and the $D_2$ scale into fifths. The diameter of the circular arc 16 and therefore the extents of both the arm and base D scales, may be of any desired length compatible with affording the desired accuracies and readability.

The body 10 also has marked or imprinted thereon an altitude line, designated Alt., which is perpendicular to the edge 12 and D scales and extends in alignment with the marking 10 on the $D_2$ scale to intersection with the circular arc 16.

As previously mentioned, the calculator operates on the principle of similar triangles, and in this respect, the Alt. line forms one side of a triangle having its other sides along the A and D scale lines, as to also similar triangles having as their parallel counterpart of the Alt. line, the H or $H_1$ line intersecting selected values on the A and D scales. The Alt. line intersects the D scale at "10" in order to provide for simple and, in effect, unity in one of the similar triangle values.

An arm 17, made in the form of a transparent strip, is pivoted to swing about the center 15 from a position, designated by the broken lines at 17a, of engagement or parallelism with the D scales or strip 13, to any of various calculating positions typified by FIGS. 1 and 2. The arm 17 carries what may be termed a pair of A scales corresponding exactly in length, divisions and their markings to the D scales, i.e., the outer $A_1$ scale being in exact correspondence with the $D_1$ scale, and the inner $A_2$ scale being in exact correspondence with the $D_2$ scale, excepting only that for convenience in use, the interval lines on the arm scales may be drawn at an appropriate angularity, say about 35 degrees, to the scale line. Because of limitations in calculating determinations occurring at the ends of the scales toward the pivot 15, markings may be there omitted and the scales started at substantially the values indicated.

The device also uses a cursor or hairline carrier 18 which in the FIGS. 1 and 2 embodiment of the invention may consist of a transparent strip carrying one or more lines, e.g. H and $H_1$, the strip having a head 19 slidable along the straight edge 12 so that the hairlines are normal to the D scales and parallel to the Alt. line. Plural H lines may be used simply as a matter of convenience in limiting necessary shifting of the cursor. The cursor may be provided as a separate piece, and for convenience, the back side of the body 10 may be provided with a pocket, not shown, to accommodate the cursor when not in use.

The stated relationships in terms of the square root of 10, between respectively the $A_1$, $A_2$ and the $D_1$, $D_2$ scales, serves to provide for extended calculation range and accuracy for desirably short scale lengths, by reason of square root cancellation effects as between the scales. Thus, e.g., where a value is selected on the $A_1$ scale for multiplication or division using the H or $H_1$ lines, the answer may be read on the $D_1$ scale, or vice versa. Where in a calculation a value is selected at the $A_1$ scale intersection with the arc 16, to be related to an H or $H_1$ selected value on the $A_2$ scale, the answer will appear at the intersection of the used H or $H_1$ line with the $D_2$ scale, by reason of its square root of 10 relation to the $A_1$ scale and correspondence with the $A_2$ scale. Similar relations and cancellation effects occur where selections are made on the D scales for answers reading in the A scales.

Figure 3:
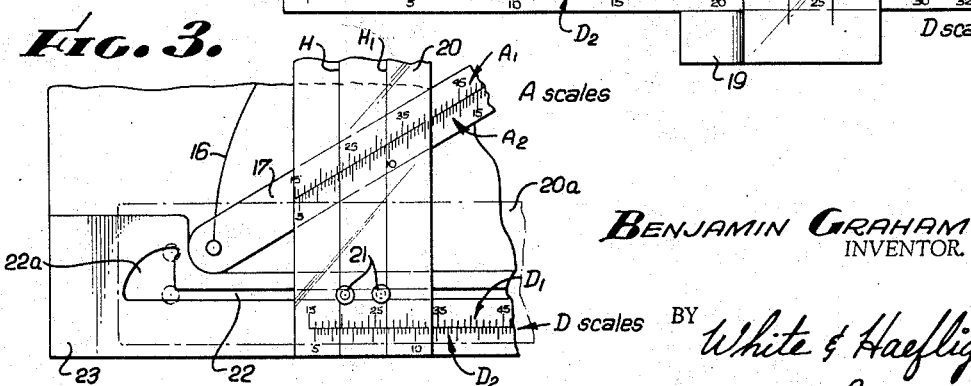
FIG. 3 is a fragmentary view illustrating a variational form of the invention.

FIG. 3 illustrates a variational form of the invention similar to the described embodiment except in the manner of accommodating the cursor as an attached component of the calculator. Here the cursor 20 is shown to be made in the form of a transparent strip carrying a pair of projections 21 which slide in a slot 22 extending through the body 23 in parallelism with the D scales so that, as before, the hairlines H, $H_1$ extend perpendicular to the D scale in the functional solid line position of the cursor. When not in use, the cursor may be slid to the left extremity of slot 22 and swung to the collapsed position indicated by broken lines 20a, as permitted by accommodation of the projections 21 within a quadrantal extension 22a of the slot.

The following are examples of various calculations involving assured factors X and Y that can be made by simple manipulations of the device.

(1) To multiply X by Y—

Method A: Swing the arm A so that the outer scale $A_1$ value for X falls on the arc 16. Place hairline H at Y on the inner arm scale $A_2$ and read the answer under the hairline H on the lower D scale $D_2$. FIG. 1 illustrates the calculations 8 (X) times 17 (Y)=136.

Method B: Swing the arm A so that X on the $A_2$ scale falls on the Alt. line, place the hairline H at Y on the $D_2$ scale and read the answer at the hairline intersection with the $A_1$ scale.

2. To divide X by Y—

Method A: Swing the arm to its Y value at the $A_1$ scale intersection with the arc 16. Place hairline H at X on the D scale and read the answer at the H intersection with the A scale.

Method B: Swing the arm to coincidence of Y on the $A_2$ scale with Alt., place H over X on the $A_1$ scale and read the answer below on the $D_2$ scale.

Method C: Using the hairline H, swing X (or Y) whichever is of greater value on the $A_1$ scale perpendicularly above Y (or X) on the $D_1$ scale and then read X/Y at Alt. on $A_2$ scale and Y/X at the arc 16 on the $A_1$ scale (or vice versa).

The choice of the most convenient method for the calculation given above may be determined by rapid inspection. For multiplication: Swing the arm up from the horizontal position until a factor (X or Y) falls either (a) on Arc C, or (b) on Alt., whichever requires a smaller upward swing. If (a), use multiplication Method A above; if (b), use multiplication Method B. For division: If the positions of X and Y (on their respective scales) are not widely separated, division Method C above is the most convenient—e.g., in the case of 70/60 or 23/75. If they are widely separated then division Method A will be used if Y is towards the right end of the scales—e.g., 50/90—and division Method B will be used when Y is nearer the left end of the scales—e.g., 60/12. Selection of the upper or lower scales for the answers and the placing of zeros or decimal points will be determined from the rough magnitudes involved (as in slide-rule use).

3. To find the square of X—

Swing X on the $A_1$ scale to coincide with arc 16 and read $X^2$ on upper $D_1$ scale below X. Alternatively, swing X on the $A_1$ scale to coincide with Alt., and read $X^2$ on the $A_2$ scale above X on the $D_1$ scale.

4. To find the square root of X—

Place H at X on upper $D_1$ scale, swing A scale to juncture of H and 16, and read answer at 16 on the $A_1$ scale. FIG. 2 illustrates the determination 9=the square root of 81, and also that 81=the square of 9 using the $H_1$ line.

I claim:

1. A scale type calculator comprising a body having a flat surface carrying across its lower extent upper and lower contiguously parallel linear base scales, an altitude line extending normal to said scales, a transparent arm pivotally mounted on said body at one end of said base scales and carrying along its length outer and inner contiguously parallel linear arm scales, said base and arm scales being the same and each comprising differently divided and numbered individual scales having progressively numbered equal divisions and numerically related so that the reading at any point along one scale is the square root of 10 times the corresponding reading on the contiguous scale, the pivot point of the arm being such that when brought into parallelism the arm and base scales have the same values at points of alinement normal thereto, said body carrying an arc intersectable with said pivot point and having its diameter along the arm scales when the latter scales are parallel to the base scales, said arc being progressively intersectable by the arm scales at varying angles by swinging the arm to selected scale values, and means movable parallel to the base scales and carrying an altitude line normal thereto and intersectable with said arm scales at different positions of the arm.

2. A calculator according to claim 1, in which said body has a semi circular periphery about and spaced from said arc.

3. A calculator according to claim 1, in which one each of said arm and base scales divides the arc diameter length into equal numbered divisions of 100.

4. A calculator according to claim 1, in which the outer arm scale and upper base scale divide the arc diameter length into equal numbered divisions of 100 which are the square root of 10 times the corresponding values on the contiguous scales.

5. A calculator according to claim 4, in which the first mentioned altitude line intersects said arc and base scale at a location corresponding to 10 on its lower numbered scale.

6. A calculator according to claim 1, in which the interval lines on the arm scales extend diagonally of the longitudinal extent of the scales.

7. A calculator according to claim 1, in which said base scales are carried on a raised strip area of the body having its edge engageable by the arm when its scales are swung parallel to the base scales.

8. A calculator according to claim 1, in which said altitude line carrying means comprises a member slidable along a guide edge of the body parallel to said base scales and having a transparent arm carrying the last mentioned altitude line.

9. A calculator according to claim 8, in which said guide edge is below the base scales.

10. A calculator according to claim 8, in which said guide edge is between the arm and base scales.

11. A calculator according to claim 8, in which said member is pivotally carried by the body.

References Cited in the file of this patent

UNITED STATES PATENTS

| | | |
|---|---|---|
| 2,892,586 | Graham | June 30, 1959 |
| 3,014,646 | Gabriel | Dec. 26, 1961 |
| 3,104,469 | Burns | Sept. 24, 1963 |